(12) United States Patent
Inomata et al.

(10) Patent No.: US 8,419,074 B2
(45) Date of Patent: Apr. 16, 2013

(54) JOINT STRUCTURE

(75) Inventors: Shinjiro Inomata, Tokyo (JP); Makoto Nakajima, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 90 days.

(21) Appl. No.: 13/297,903

(22) Filed: Nov. 16, 2011

(65) Prior Publication Data
US 2012/0181788 A1 Jul. 19, 2012

(30) Foreign Application Priority Data

Nov. 19, 2010 (JP) ................................. 2010-259162

(51) Int. Cl.
*F16L 13/02* (2006.01)

(52) U.S. Cl.
USPC ..................................................... 285/288.1

(58) Field of Classification Search ............... 285/288.1, 285/288.8
See application file for complete search history.

(56) References Cited

U.S. PATENT DOCUMENTS

| 2,132,575 A | * | 10/1938 | Moise | 285/288.1 |
| 2,448,907 A | * | 9/1948 | Ost | 285/288.1 |
| 3,512,811 A | * | 5/1970 | Moody et al. | 285/288.1 |
| 5,901,988 A | * | 5/1999 | Aihara et al. | 285/288.1 |
| 6,371,526 B1 | * | 4/2002 | Ekholm | 285/288.1 |
| 7,011,343 B1 | * | 3/2006 | Shah | 285/288.1 |
| 7,887,100 B1 | * | 2/2011 | Paolone | 285/288.1 |
| 7,900,741 B2 | * | 3/2011 | Nakazato et al. | 29/525.14 |

FOREIGN PATENT DOCUMENTS

JP 9-159779 A 6/1997

* cited by examiner

*Primary Examiner* — David E Bochna
(74) *Attorney, Agent, or Firm* — Westerman, Hattori, Daniels & Adrian, LLP

(57) ABSTRACT

In a joint structure, a tube member having a polygonal cross-section can be joined to a flange surface by full penetration welding with good strength margin, without imparting unreasonable force to the weld portion. The joint structure comprises a polygonal cylindrical lower guide tube joined by butt welding to a surface of a middle flange having a through-hole of the same shape as the lower guide tube, wherein at the end of the lower guide tube, within the linear portions that constitute each of the sides of the lower guide tube, there exists a weld portion welded to the surface in at least one location and an unwelded portion located separately from the weld portion, and a level difference at least as large as a distance equivalent to the weld shrinkage of the weld portion is provided between the end positions of the weld portion of the unwelded portion.

4 Claims, 4 Drawing Sheets

JOINT STRUCTURE

TECHNICAL FIELD

The present invention relates to a joint structure in which a polygonal cylindrical tube member is joined by butt welding to the flange surface of a flange having a through-hole of substantially the same shape as the tube member.

BACKGROUND ART

The power from a nuclear reactor is controlled using nuclear reactor control rods, the insides of which are filled with a material that absorbs neutrons, with the control rods being inserted into the reactor core or retracted from the reactor core as required (see PTL 1).

These control rods are stored inside control rod cluster guide tubes provided above the nuclear reactor vessel, and are moved up and down using a control rod drive device positioned above the guide tubes. These control rod cluster guide tubes each comprise, for example, an upper guide tube with a circular cross-section and a lower guide tube with a square cross-section, with these upper and lower guide tubes forming the external shape of the guide tube.

The control rod cluster guide tubes are installed in a region corresponding with a high flow rate for the main flow of the primary coolant, and the upper guide tube and lower guide tube perform the role of protecting the control rods from the fast flowing primary coolant in order to enable the control rods to be positioned accurately to facilitate their insertion and retraction. The lower guide tube is sometimes referred to as an enclosure because it encloses the periphery of the control rod.

In the control rod cluster guide tubes, a flange fitted to the bottom end of the upper guide tube is abutted against a flange fitted to the top end of the lower guide tube, and bolts are then used to secure the guide tube to the upper surface of an upper core support plate. The flange fitted to the top end of the lower guide tube is positioned near the middle of the control rod cluster guide tube in the height direction, and is therefore sometimes referred to as the middle flange.

Conventionally, attachment of the flange to the lower guide tube is performed by inserting the lower guide tube within a through-hole formed in the flange, and then fillet welding the outer peripheral surface of the lower guide tube to the flange surface, and the tip of the lower guide tube to the inner peripheral surface of the through-hole.

CITATION LIST

Patent Literature

{PTL 1} Japanese Unexamined Patent Application, Publication No. Hei 9-159779

SUMMARY OF INVENTION

Technical Problem

In a nuclear reactor, strength examination is performed for all welded portions. This strength testing includes, for example, radiographic testing (RT testing), penetrant testing (PT testing) and visual inspection, and the weld strength varies depending on which tests are performed. By performing all of these tests, a large strength margin can be achieved for the weld portion.

In the case of the weld joint mentioned above, because only a visual inspection can be performed in the case of filleted welding, it is desirable that full penetration butt welding is used, which is a welding method that provides a comparatively large weld strength and is capable of achieving a comparatively large strength margin. By performing RT testing in addition to full penetration welding, the strength margin can be further improved.

When a tube is abutted against a flat surface (flange surface) and subjected to full penetration welding, a protrusion having a shape that matches the cross-sectional shape of the tube is formed on the flange surface, and the protrusion and the tube are butted together and butt welded. In cases such as the lower guide tube described above where the tube has a polygonal cross-section, the dimensional precision of the cross-sectional shape is inferior to that of a round cross-section, and therefore the cross-sectional shape tends to fluctuate between individual pipes.

As a result, the protrusion on the flange surface and the pipe may be slightly offset, making it difficult to achieve a good butt weld.

The present invention has been developed in light of the above circumstances, and has an object of providing a joint structure in which a tube member having a polygonal cross-section can be joined to a flange surface of a flange by full penetration welding with good strength and a favorable strength margin, without imparting unreasonable force to the weld portion.

Solution to Problem

In order to achieve the above object, the present invention adopts the aspects described below.

In other words, one aspect of the present invention provides a joint structure comprising a polygonal cylindrical tube member joined by butt welding to the flange surface of a flange having a through-hole of substantially the same shape as the tube member, wherein at the end portion of the joined tube member, within the substantially linear portions that constitute each of the sides of the tube member, there exists a weld portion which is welded to the flange surface in at least one location and an unwelded portion located separately from the weld portion, and a level difference that is at least as large as a distance equivalent to the weld shrinkage of the weld portion is provided between the end position of the weld portion and the end position of the unwelded portion.

According to the joint structure of this aspect, because a level difference is provided between the end position of the weld portion and the end position of the unwelded portion, the end portion of the tube member contacts the flange surface at the weld portion, whereas a space exists between the end position of the unwelded portion and the flange surface.

A welding groove is formed at the weld portion, and the entire end surface of the tube member at the weld portion is joined to the flange surface by welding. In other words, the weld portion of the tube member is joined to the flange surface by full penetration welding, and therefore a joint with a favorable strength margin can be achieved.

When a joint is formed by welding in this manner, the dimensions of the weld portion undergo shrinkage upon cooling in so-called "weld shrinkage", but because the end position of the unwelded portion is formed with a level difference relative to the end position of the weld portion that is at least as large as a distance equivalent to the weld shrinkage of the weld portion, the unwelded portion does not make contact with the flange surface even when such weld shrinkage occurs. Provided the unwelded portion does not make contact with the flange surface, no compressive stress occurs between the unwelded portion and the flange surface, and therefore a tensile stress that occurs as a reactive force accompanying the compressive stress between the unwelded portion and the flange surface can be prevented from acting upon the welded section of the weld portion. In this manner, the application of unreasonable force to the welded section of the weld portion can be prevented, enabling the product quality to be improved.

Because a weld portion is provided on the substantially linear portion that constitutes each side of the tube member, strength testing of the weld portion using radiographic testing (RT testing) or the like can be performed easily and reliably, enabling a large strength margin to be achieved.

The welding may be performed from the outer peripheral side or the inner peripheral side of the joint, or may be performed from both the outer peripheral side and the inner peripheral side.

In the aspect described above, a single-U groove may be formed on the outer peripheral side of the weld portion.

If a single-U groove is formed on the outer peripheral side of the weld portion in this manner, then the U-shaped groove is able to increase the amount of welding, enabling full penetration welding to be performed more reliably. Further, because the welding operation can be performed from the outer peripheral side of the tube member, the welding operation can be performed relatively easily.

In the aspect described above, the shape of the through-hole may be approximately the same size as, or smaller than, the inside shape of the tube member.

By adopting this type of configuration, the inner periphery of the through-hole is positioned inside the inner periphery of the weld portion, and therefore a weld leg length equivalent to the tube thickness can be ensured. This enables full penetration welding of the weld portion to be achieved with even greater reliability.

For example, when welding is performed from the inner peripheral side, in order to improve the weldability, it is preferable that when the tube member is pressed against the flange surface, the inner peripheral surface of the through-hole is melted, thereby eliminating the level difference between the inner peripheral surface of the through-hole and the weld portion.

Advantageous Effects of Invention

In the joint structure according to the present invention, the weld portion of the tube member is butt welded to the flange surface, enabling a joint with a good strength margin to be obtained.

Because a level difference that is at least as large as a distance equivalent to the weld shrinkage of the weld portion is provided between the end position of the weld portion and the end position of the unwelded portion, the application of unreasonable force to the welded section of the weld portion can be prevented.

DESCRIPTION OF EMBODIMENTS

A nuclear reactor 1 according to an embodiment of the present invention is described below with reference to FIG. 1 to FIG. 5.

Figure 1:
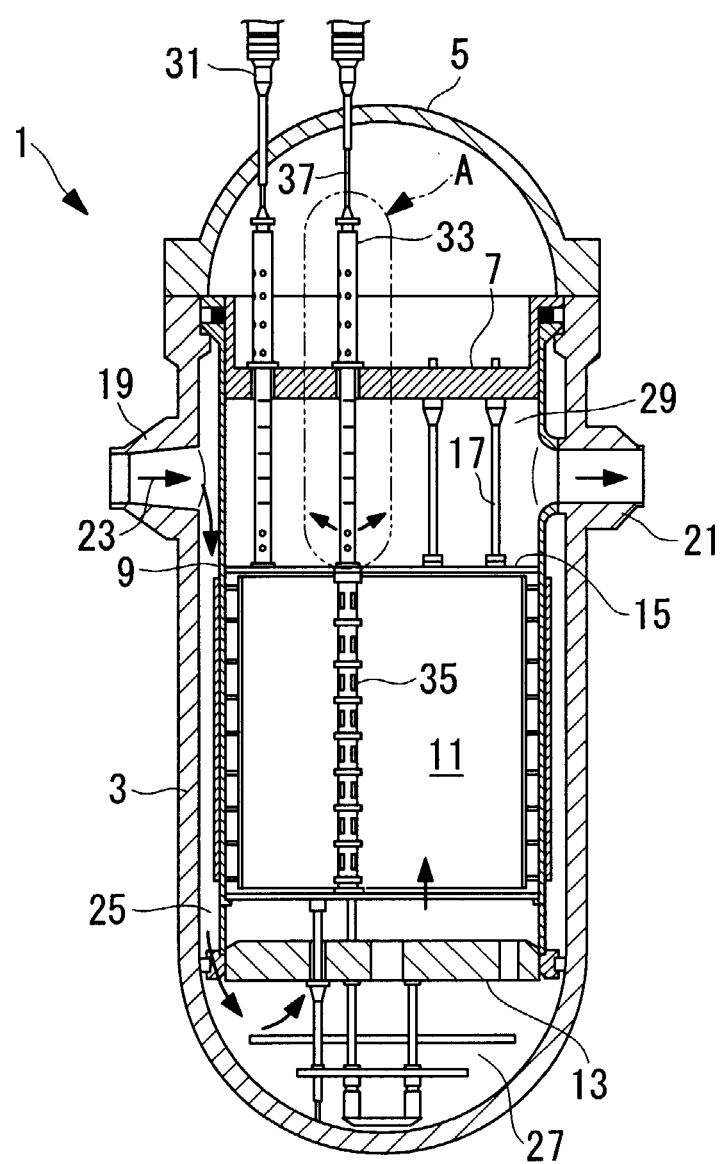
FIG. 1 is a schematic sectional elevation view illustrating one example of the internal structure of a pressurized water nuclear reactor.
Figure 2:
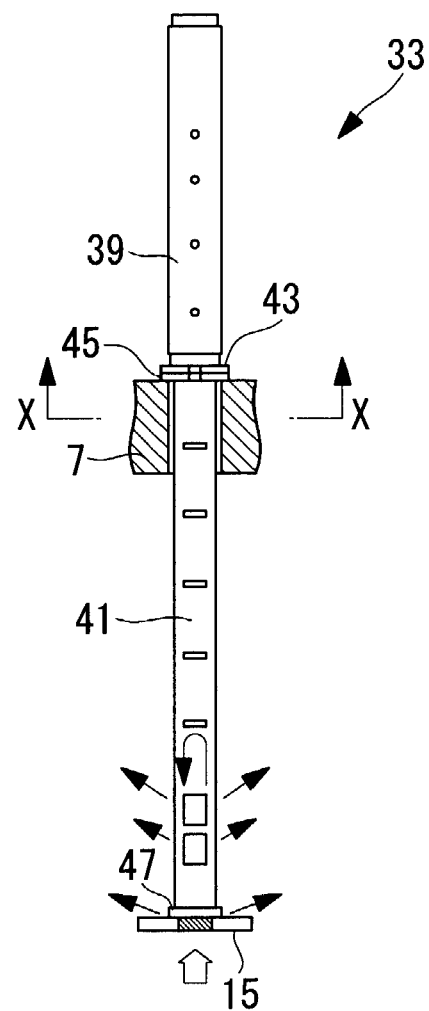
FIG. 2 is an enlarged partial sectional view illustrating an enlarged view of section A in FIG. 1.
Figure 3:
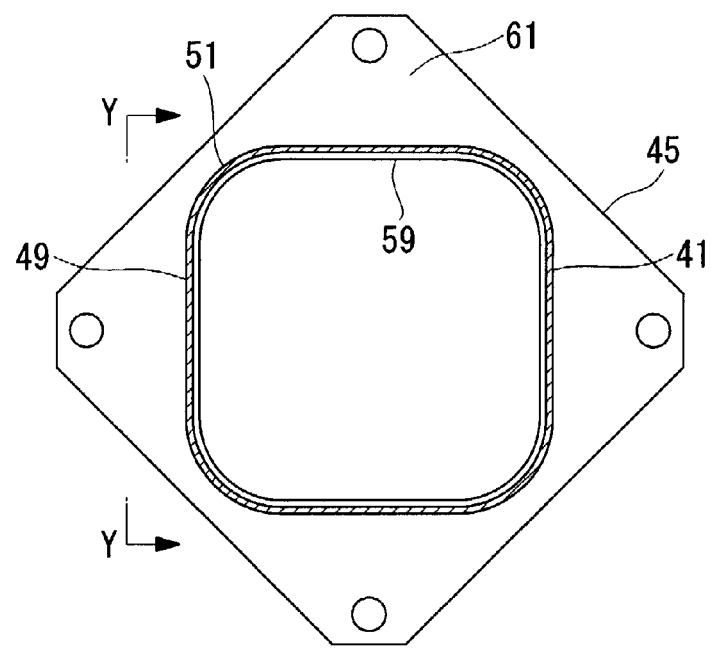
FIG. 3 is a cross-sectional view along the line X-X in FIG. 2.
Figure 4:
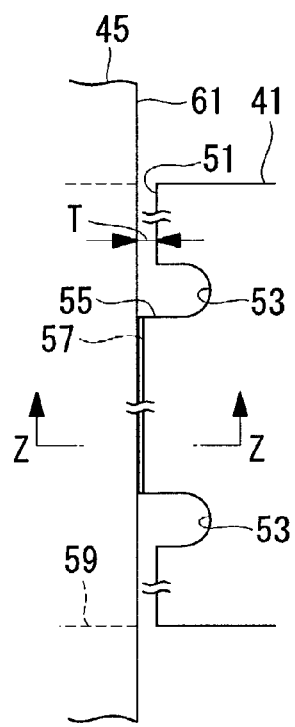
FIG. 4 is a view along the line Y-Y in FIG. 3.
Figure 5:
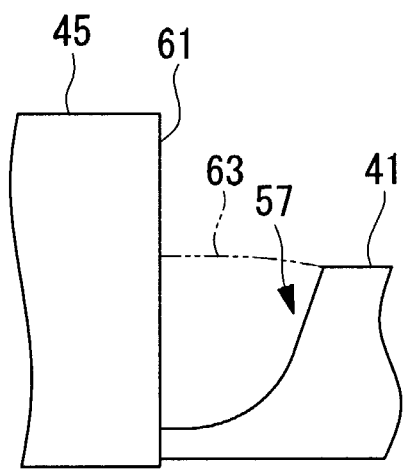
FIG. 5 is a cross-sectional view along the line Z-Z in FIG. 4.

FIG. 1 is a cross-sectional view illustrating one example of a representative internal structure of a pressurized water nuclear reactor 1. FIG. 2 is a diagram illustrating a control rod cluster guide tube 33 that uses a joint structure according to an embodiment of the present invention, and represents an enlarged partial sectional view illustrating an enlarged view of section A in FIG. 1. FIG. 3 is a cross-sectional view along the line X-X in FIG. 2. FIG. 4 is a view along the line Y-Y in FIG. 3. FIG. 5 is a cross-sectional view along the line Z-Z in FIG. 4.

The nuclear reactor 1 comprises a substantially circular cylindrical main vessel 3 that is substantially hemispherical at one end and open at the other end, a substantially hemispherical vessel head 5 that is fitted to the main vessel 3 so as to cover the open end of the main vessel 3, an upper core support plate 7 that is fitted inside the main vessel 3 so as to seal the opening, an inner cylinder 9 that is installed inside the main vessel 3 with a spacing provided therebetween, and a reactor core 11 comprising a plurality of fuel assemblies that is installed inside the inner cylinder 9 at a position beneath the upper core support plate 7.

The inner cylinder 9 has a substantially circular cylindrical shape, the upper end of which is attached to the upper core support plate 7. The lower end of the inner cylinder 9 is sealed with an inner cylinder bottom plate 13 which is joined to the main vessel 3. As a result, the main vessel 3 is partitioned by the inner cylinder 9 and the inner cylinder bottom plate 13 inlet opening into an inside space and an outside space.

An upper core plate 15 that forms the upper portion of the reactor core 11 is suspended from and supported by the upper core support plate 7 via a plurality of upper core support columns 17.

An inlet nozzle 19 that interconnects the space between the main vessel 3 and the inner cylinder 9 with the outside of the main vessel 3 is formed in a position within the upper portion of the main vessel 3. Further, an outlet nozzle 21 that interconnects the space inside the inner cylinder 9 with the outside of the main vessel 3 is formed in a position within the upper portion of the main vessel 3.

A coolant 23 that flows into the main vessel 3 through the inlet nozzle 19 flows down through a downcomer 25, which is the doughnut-shaped space formed between the main vessel 3 and the inner cylinder 9, and then reaches a lower plenum 27, which is the space formed between the inner cylinder bottom plate 13 and the main vessel 3.

Having reversed direction in the lower plenum 27, the coolant 23 flows up into the reactor core 11 through a plurality of through-holes provided in the inner cylinder bottom plate 13, is heated to a high temperature, and then passes through through-holes in the upper core plate 15 into an upper plenum 29, which is the space formed between the inner cylinder 9, the upper core support plate 7 and the upper core plate 15.

The high-temperature coolant 23 then passes out through the outlet nozzle 21 from the upper plenum 29, and is supplied to a steam generator not shown in the drawing.

Control rod cluster guide tubes 33 are inserted through the upper core support plate 7 in positions corresponding with a control rod drive device 31 provided above the upper lid 5. A plurality of control rods 37, one of which is inserted in each hollow guide tube 35 of the fuel assembly, are assembled in a cluster shape using a spider member not shown in the drawing, and this cluster of control rods is known as the control rod assembly or control rod cluster. When this control rod assembly is driven in the vertical direction by the control rod drive device 31, the assembly is guided by the control rod cluster guide tubes 33.

The control rod cluster guide tube 33 is described below with reference to FIG. 2 to FIG. 5.

As illustrated in FIG. 2, the control rod cluster guide tube 33 comprises an upper guide tube 39 and a lower guide tube (tube member) 41.

An upper flange 43 is fitted to the lower end of the upper guide tube 39.

A middle flange 45 is fitted to the upper end of the lower guide tube 41, and a lower flange 47 is fitted to the lower end of the lower guide tube 41. The control rod cluster guide tube 33 is attached and secured to the upper surface of the upper core support plate 7 with the upper flange 43 and the middle flange 45 pressed together by bolting the upper flange 43 and the middle flange 45 to the upper core support plate 7.

The upper guide tube 39 has a cylindrical shape with a substantially circular cross-section. As illustrated in FIG. 3, the lower guide tube 41 has a cylindrical shape with a substantially square cross-section. As is evident from the cross-sectional shape, the lower guide tube 41 comprises linear portions 49 that extend in a substantially linear manner and constitute each of the sides of the tube, and corner portions (unwelded portions) 51 that join adjacent linear portions 49.

As illustrated in FIG. 4, a level difference T is provided between the end position within the central region of the linear portion 49 and the end position of the corner portions 51. U-shaped notches (unwelded portions) 53 that enhance the weldability are provided between the end portions of the corner portions 51 and the linear portion 49.

The protruding portion on each of the linear portions 49 functions as a weld portion 55, and a single-U groove 57 is formed at the tip of this portion, as illustrated in FIG. 5.

In this embodiment, a weld portion 55 is provided on the linear portion 49 on each side of the tube, but the present invention is not limited to this particular configuration. The weld portion 55 is configured so as to provide a predetermined joint strength, and may also be provided at the linear portion 49 of only one side, or provided at the linear portions 49 on 2 or 3 sides.

In order to ensure appropriate perpendicularity between a surface portion 61 and the lower guide tube 41, weld portions 55 are preferably provided along a plurality of sides.

The middle flange 45 has a substantially square shape in which the corners have been removed, and a through-hole 59 having substantially the same shape as the cross-sectional shape of the lower guide tube 41 is provided in the center of the middle flange 45.

The lower guide tube 41 is joined by butt welding to the surface portion (flange surface) 61 on one side of the middle flange 45.

The shape of the through-hole 59 is slightly smaller than the inside shape of the lower guide tube 41. This means that, for example, even if manufacturing error results in fluctuations in the dimensions of the lower guide tube 41, the inside surface of the through-hole 59 will still be positioned inside or substantially in line with the inner surface of the lower guide tube 41.

A method of manufacturing the control rod cluster guide tube 33 of the configuration described above is described below, mainly in terms of the method of joining the lower guide tube 41 and the middle flange 45.

The lower guide tube 41 is positioned in a horizontal orientation, and the middle flange 45 is positioned so that the surface portion 61 is able to be fitted perpendicularly to the end portion of the lower guide tube 41. At this time, the end portion of the corner portions 51 are separated from the surface portion 61 by a level difference T, and the notches 53 are separated by an even larger spacing.

The middle flange 45 or the lower guide tube 41 is then moved in a horizontal direction to align the central axis of the lower guide tube 41 and the central axis of the through-hole 59. Performing this operation positions the inside surface of the through-hole 59 either in line with or slightly inside the inner peripheral surface of the lower guide tube 41, as illustrated in FIG. 3.

Subsequently, penetration welding is performed from the outer peripheral side of the lower guide tube 41 along the single-U groove 57 of the weld portion 55 while a weld metal is added.

In this manner, the entire surface of the end portion of the lower guide tube 41 within the weld portion 55 is welded to the surface portion 61. In other words, the weld portion 55 of the lower guide tube 41 is joined to the surface portion 61 by full penetration welding, and therefore a joint with a favorable strength margin can be obtained.

At this time, because the weld portion 55 includes the single-U groove 57, the amount of welding can be increased compared with the case of a linear groove such as a V-groove or the like. As a result, full penetration welding can be performed reliably between the surface portion 61 and the lower guide tube 41.

Further, because the welding operation can be performed from the outer peripheral side of the lower guide tube 41, the welding operation can be completed relatively easily.

As the welded section 63 is cooled, the dimensions shrink as so-called welding shrinkage occurs. At this time, the level difference T is set to a value that is at least as large as a distance equivalent to the weld shrinkage of the welded section 63. Accordingly, even if welding shrinkage of the welded section 63 occurs, the corner portions 51 and the notches 53 do not make contact with the surface portion 61.

Provided the corner portions 51 do not make contact with the surface portion 61, no compressive stress occurs between the corner portions 51 and the surface portion 61, and therefore a tensile stress that occurs as a reactive force accompanying the compressive stress between the corner portions 51 and the surface portion 61 can be prevented from acting upon the welded section 63 of the weld portion 55. In this manner, the application of unreasonable force to the welded section 63 can be prevented, enabling the quality of the lower guide tube 41 to be improved.

In the present embodiment, the inner surface of the through-hole 59 is positioned inside the inner surface of the lower guide tube 41, and therefore a weld leg length equivalent to the plate thickness can be ensured. This enables full penetration welding of the weld portion to be achieved with greater reliability.

In the present embodiment, the single-U groove 57 was provided on the outer peripheral side of the weld portion 55, and welding was performed from the outer peripheral side, but the present invention is not limited to this particular configuration, and welding may also be performed from the inner peripheral side or from both the outer peripheral side and the inner peripheral side.

By performing welding from both the outer peripheral side and the inner peripheral side, full penetration welding of the weld portion 55 can be achieved with even greater reliability.

If satisfactory welding quality can be achieved by performing welding from only the outer peripheral side or the inner peripheral side, then welding need not necessarily be performed from both the outer peripheral side and the inner peripheral side.

Because the inner surface of the through-hole 59 is positioned inside the inner surface of the lower guide tube 41, a level difference occurs between the inner surface of the through-hole 59 and the inner surface of the lower guide tube 41 (the weld portion 55).

If a level difference occurs between the inner surface of the through-hole 59 and the inner surface of the weld portion 55, then it is possible that the weldability may deteriorate when welding is performed from the inner peripheral side, and therefore it is preferable that when the lower guide tube 41 is pressed against the surface portion 61, the inner peripheral surface of the through-hole 59 is melted, thereby eliminating the level difference between the inner surface of the through-hole 59 and the inner surface of the weld portion 55 and improving the weldability.

In the lower guide tube 41 assembled in the manner described above, the welded section 63 can be subjected to radiographic testing (RT testing) in accordance with conventional regulations to evaluate the strength.

Because the weld portion 55 where the welded section 63 is formed is provided on each linear portion 49 that extends in a substantially linear manner and constitutes one side of the lower guide tube 41, each welded section 63 is formed in a substantially linear manner. As a result, strength testing of the welded sections 63 by RT testing or the like can be performed easily and reliably.

In the present embodiment, the cross-sectional shape of the lower guide tube 41 is a substantially square shape, but the present invention is not limited to this particular configuration. For example, the cross-sectional shape of the lower guide tube 41 may also be rectangular, triangular, or a polygonal shape having 5 or more sides.

The technical scope of the present invention is not limited by the embodiment described above, and various modifications can be made without departing from the scope of the present invention.

For example, in the above embodiment, the joint structure of the present invention was applied to the control rod cluster guide tubes 33 of the nuclear reactor 1, but the present invention may also be used for joint structures formed between a polygonal tube and a flange in various other situations.

REFERENCE SIGNS LIST

41 Lower guide tube
45 Middle flange
51 Corner portion
53 Notch
55 Weld portion
57 Single-U groove
59 Through-hole
61 Surface portion
T Level difference

The invention claimed is:

1. A joint structure comprising a polygonal cylindrical tube member joined by butt welding to a flange surface of a flange having a through-hole of a substantially identical shape to the tube member, wherein
   at an end portion of the joined tube member, within substantially linear portions that constitute sides of the tube member, there exists a weld portion that is welded to the flange surface in at least one location and an unwelded portion located separately from the weld portion, and
   a level difference, that is at least as large as a distance equivalent to a weld shrinkage of the weld portion before welding, is provided between an end position of the unwelded portion and the flange,
   wherein the level difference is a gap between the end portion of corner portions of the tube member and the flange surface of the flange.

2. The joint structure according to claim 1, wherein a single-U groove is formed on an outer peripheral side of the weld portion.

3. The joint structure according to claim 2, wherein a shape of the through-hole is substantially an equal size to, or smaller than, an inside shape of the tube member.

4. The joint structure according to claim 1, wherein a shape of the through-hole is substantially an equal size to, or smaller than, an inside shape of the tube member.

* * * * *